Z. M. DREW.
Pitman-Couplings.

No. 151,861. Patented June 9, 1874.

UNITED STATES PATENT OFFICE.

ZEBOLON M. DREW, OF HOWELL, MICHIGAN.

IMPROVEMENT IN PITMAN-COUPLINGS.

Specification forming part of Letters Patent No. 151,861, dated June 9, 1874; application filed April 14, 1874.

*To all whom it may concern:*

Be it known that I, ZEBOLON M. DREW, of Howell, in the county of Livingston and State of Michigan, have invented an Improvement in Pitmen-Coupling for Harvesters, of which the following is a specification:

This invention has for its object to provide a joint for coupling the pitman of a harvester to the cutter-bar, which will combine all the advantages of the ball-and-socket joint with a simple and effective means for taking up the wear, and thus avoid the evils attendant upon play or lost motion in the joint. The invention consists in providing a split pitman, with a screw-thread upon the exterior of the split end, with one or more nuts to force forward a conical sleeve, which will compress the spread ends, as more fully hereinafter set forth.

Figure 1:
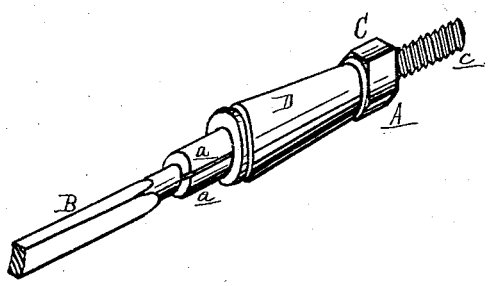
Figure 2:
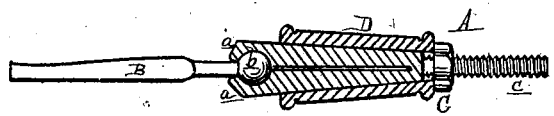

Figure 1 is a perspective view of a portion of a harvester-pitman and cutter-bar, showing my improved coupling. Fig. 2 is a longitudinal section.

In the drawing, A represents one end of a pitman, and B the connecting end of a cutter-bar, having on its end a ball, $b$, which is received between spherical sockets $a$, formed in the inner faces of the end of the pitman, which is split and spread apart for that purpose. Upon the cylindrical part of the pitman is cut a screw-thread, $c$, upon which is screwed one or more nuts, C, to push forward a sleeve D, toward the ends, which it compresses upon the ball $b$. The sleeve may be dispensed with by extending the thread along the backs of the split ends and running the nuts upon them; but this is not as reliable a means for taking up the wear and play as the sleeve pushed forward by the nut.

What I claim as my invention, and desire to secure by Letters Patent, is—

In the pitman A, split and provided with sockets $a\ a$, the nut C and sleeve D, substantially as and for the purpose set forth.

ZEBOLON M. DREW.

Witnesses:
   H. F. EBERTS,
   C. E. HUESTIS.